M. G. BUNNELL.
LINK BELT.
APPLICATION FILED JULY 8, 1910.
1,191,395.
Patented July 18, 1916.
2 SHEETS—SHEET 1.
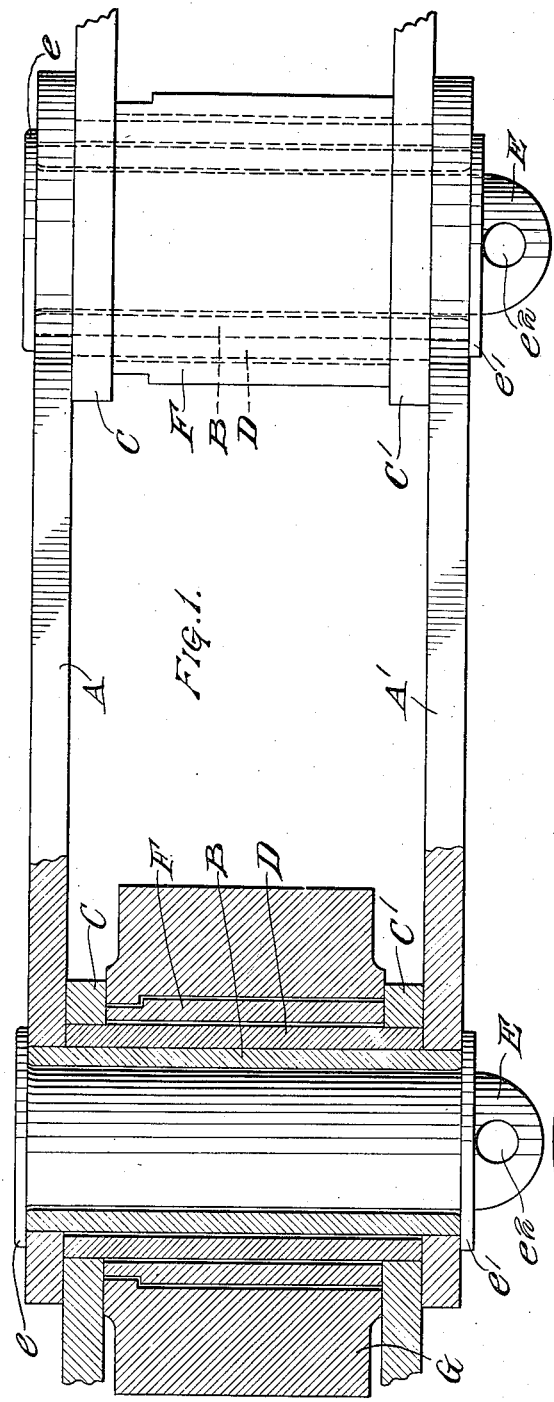
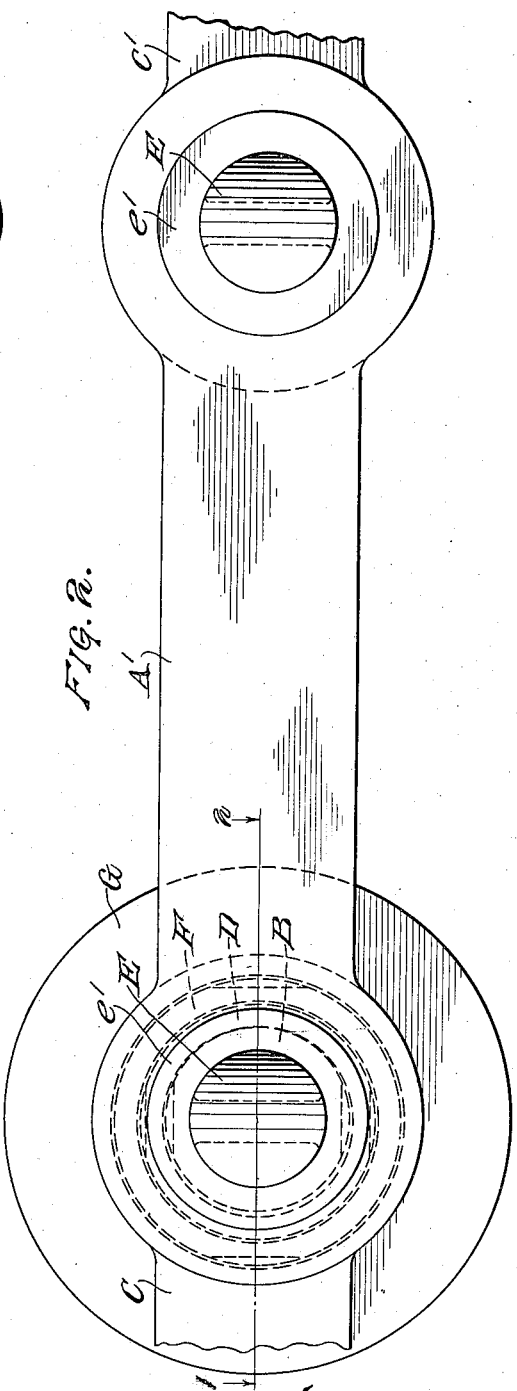

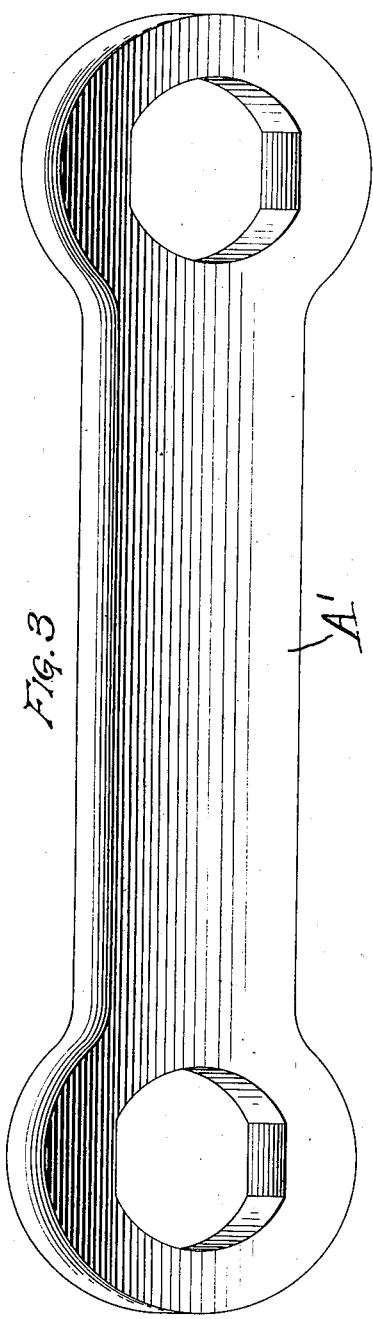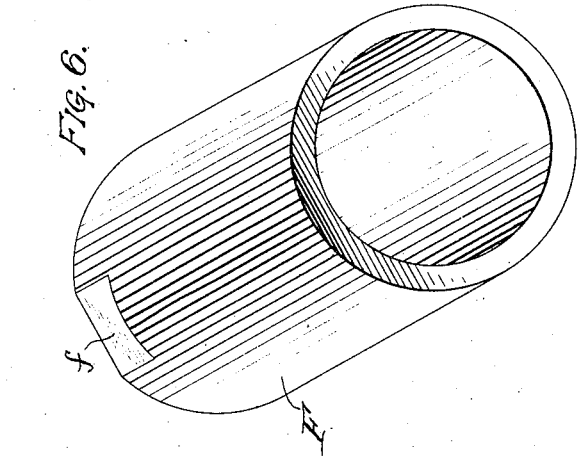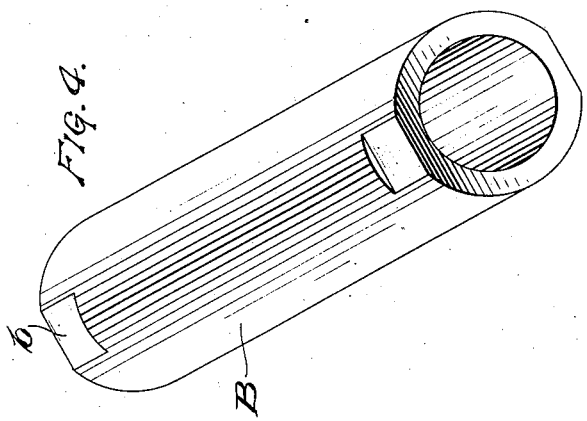

UNITED STATES PATENT OFFICE.

MORTON G. BUNNELL, OF CHICAGO, ILLINOIS, ASSIGNOR TO FREDERICK C. AUSTIN, OF CHICAGO, ILLINOIS.

LINK BELT.

1,191,395. Specification of Letters Patent. Patented July 18, 1916.

Application filed July 8, 1910. Serial No. 570,946.

*To all whom it may concern:*

Be it known that I, MORTON G. BUNNELL, a citizen of the United States of America, and resident of Chicago, Cook county, Illinois, have invented a certain new and useful Improvement in Link Belts, of which the following is a specification.

My invention relates to chains or link belts for use in excavating or conveying or other similar machinery.

My invention contemplates a link belt in which there is no wear on the links, the wear being on sleeves which connect the links, whereby the pins or bolts that hold the two sides of the chain or belt together are not subject to wear, and serve merely to hold the link belt together.

With a link belt constructed in accordance with my invention, there is considerably less wear, less friction, and less danger of breakage than heretofore, especially where the link belt is used in an excavating machine, or in a conveying apparatus of some kind, which always involves hard usage, as will hereinafter more fully appear.

Another object of my invention is to provide a chain or link belt in which the wear is confined to certain parts thereof, which parts can be readily replaced when worn, whereby the chain or link belt when worn or impaired by usage does not need to be thrown away or discarded, but may be readily repaired, thus providing practically a new chain or belt.

To the foregoing and other useful ends, my invention consists in matters hereinafter set forth and claimed.

In the accompanying drawings—Figure 1 is a plan of a section of link belt constructed in accordance with my invention, showing a portion thereof in section, the section being taken on line 1—2 in Fig. 2; Fig. 2 is a side elevation of the link-belt construction shown in Fig. 1; Fig. 3 is a perspective of one of the links shown in the preceding figures; Fig. 4 is a perspective of the smallest sleeve involved in the pivotal or hinge connection between the links; Fig. 5 is a perspective of the next larger sleeve involved in the said construction; and Fig. 6 is a perspective of the largest sleeve involved in the said construction.

As thus illustrated, my invention comprises a pair of outer links A and A', which are suitably spaced apart and connected at their ends by sleeves B, which sleeves are provided with flattened portions $b$ at their ends, whereby they fit the holes in the ends of the links, and are keyed against rotation, as shown more clearly in Figs. 3 and 4. The inner links C, C' are disposed immediately inside of the links A and A', and have their end portions connected by sleeves D, which sleeves have flattened portions $d$ that fit the holes in the links C and C', as indicated in Fig. 5. Thus, the outside links are connected together by transverse sleeves that are practically rigid therewith, and the inner links are connected in a similar manner. The pins E extend through the openings or bores of the sleeves B, and have heads $e$, and washers $e'$ that overlap the ends of the sleeves B so as to engage the outer surfaces of the links A and A', thereby preventing the links at opposite sides of the chain from spreading apart. The sleeve F is disposed upon the sleeve D so as to rotate thereon, and has a flattened end portion $f$ which engages a similarly shaped hole in the hub of the wheel G, which latter is slipped over the sleeve F and adapted to rotate therewith. Thus there is absolutely no wear upon the pins E, the opposing surfaces of the sleeves B and D being subject to the greatest wear, and the outer surface of the sleeve D taking up the wear between the chain and the wheels thereof. It will be seen that the sleeve B does not need to fit accurately within the bore or opening of the sleeve D, but may fit loosely therein, so that when the chain is carrying a load the contact between the two sleeves will be limited to one side thereof, as shown in Figs. 1 and 2. In this way there is no necessity for great accuracy in the fitting together of these parts, as one concentric part can be somewhat larger than the other and still insure a proper and efficient mode of operation for the chain.

A chain or link belt of this kind is, I find, extremely strong and reliable in use, and can be used in many places where it will give more satisfaction than those heretofore employed for purposes of this kind. There is absolutely no wear on the links A and A', or upon the links C and C', as in each case these links are secured to sleeves, which sleeves do not turn in the links, notwithstanding that they are easily removable therefrom. The chain or link belt can be easily taken apart and assembled, and broken or worn parts can be either repaired or removed and new parts substituted therefor. A chain of this kind is especially adapted for use in excavators, where it is liable to become clogged with mud, and in such case the dirt and water appear to have no detrimental effect thereon. The pins or bolts serve merely to hold the two sides of the link belt together, and do not sustain the pull or draft, and are not subject to any wear. These pins may be held in place by cotter pins or other devices inserted through the holes $e^2$ in the ends thereof, so as to hold the washers or flanges $e'$ in place in a manner that will be readily understood. Consequently the chain is, as stated, of such a construction that it may be very easily and quickly assembled, and as readily taken apart.

One of the great advantages of my invention resides in the fact that when the chain is worn or impaired by usage, it does not need to be discarded or thrown away. Ordinarily a chain or link belt, when worn or injured by usage, must be thrown away and a new chain provided, and this is especially so when the wear is more or less evenly distributed over all of the links of the chain. With my improved construction, however, the wear is confined to a plurality of sleeves which can be readily removed when they become worn or impaired by long or continued use, and new parts substituted therefor, thus providing practically a new chain. To thus render the chain practically new and ready for efficient service again, by the replacing of as small portions thereof as possible is one of the principal objects and advantages of my invention.

What I claim as my invention is:

1. A link belt comprising inner and outer overlapping links, tubes having their opposite ends removably inserted in the outer links, said ends being formed to prevent rotation of the tubes relative to said outer links, and to space said outer links apart, sleeves mounted to rotate on said tubes, the opposite ends of said sleeves being removably and non-rotatably inserted in said inner links, and a member extending loosely through each tube and projecting from the ends thereof, the opposite ends of said members being provided with retaining means for preventing displacement of the outer links from the ends of said tubes, cylindric elements loosely mounted on said sleeves, and rollers on said elements, rotating therewith upon said sleeves.

2. A link belt comprising inner and outer over-lapping links, tubes having their opposite ends removably inserted in the outer links, said ends being formed to prevent rotation of the tubes relative to said outer links and to space said outer links apart, sleeves mounted to rotate on said tubes, the opposite ends of said sleeves being removably and non-rotatably inserted in said inner links, and a member extending loosely through each tube and projecting from the ends thereof, the opposite ends of said members being provided with retaining means for preventing displacement of the outer links from the ends of said tubes, cylindric elements loosely mounted on said sleeves, and rollers on said elements, rotating therewith upon said sleeves, said tubes and sleeves being flattened at opposite sides of both ends thereof, and said links having round openings flattened at opposite sides of each opening.

3. A link belt comprising inner and outer over-lapping links, tubes having their opposite ends removably inserted in the outer links, said ends being formed to prevent rotation of the tubes relative to said outer links and to space said outer links apart, sleeves mounted to rotate on said tubes, the opposite ends of said sleeves being removably and non-rotatably inserted in said inner links, and a member extending loosely through each tube and projecting from the ends thereof, the opposite ends of said members being provided with retaining means for preventing displacement of the outer links from the ends of said tubes, cylindric elements loosely mounted on said sleeves, and rollers on said elements, rotating therewith upon said sleeves, said elements being flattened at opposite sides of one end only thereof, and said rollers having round bores restricted at one end only.

Signed by me at Chicago, Illinois, this 30th day of June, 1910.

MORTON G. BUNNELL.

Witnesses:
WM. B. DEERNION,
J. NORBY.